(12) United States Patent
Okuno et al.

(10) Patent No.: US 7,879,496 B2
(45) Date of Patent: Feb. 1, 2011

(54) BATTERY ELECTRODE SUBSTRATE, BATTERY ELECTRODE, AND ALKALINE SECONDARY BATTERY INCLUDING THE SAME

(75) Inventors: Kazuki Okuno, Itami (JP); Masahiro Kato, Itami (JP); Jin-Joo Park, Itami (JP); Hitoshi Tsuchida, Imizu (JP); Tadashi Omura, Imizu (JP); Junichi Nishimura, Imizu (JP)

(73) Assignees: Sumitomo Electric Industries, Ltd., Osaka-shi, Osaka (JP); Sumitomo Electric Toyama Co., Ltd., Imizu-shi, Toyoma (JP)

( * ) Notice: Subject to any disclaimer, the term of this patent is extended or adjusted under 35 U.S.C. 154(b) by 261 days.

(21) Appl. No.: 11/894,964

(22) Filed: Aug. 22, 2007

(65) Prior Publication Data

US 2008/0063942 A1 Mar. 13, 2008

(30) Foreign Application Priority Data

Sep. 7, 2006 (JP) .............................. 2006-243372

(51) Int. Cl.
*H01M 4/52* (2010.01)
(52) U.S. Cl. ..................................... 429/232
(58) Field of Classification Search ................... 429/232
See application file for complete search history.

(56) References Cited

U.S. PATENT DOCUMENTS

| 6,287,446 | B1 | 9/2001 | Bugnet et al. | |
|---|---|---|---|---|
| 2001/0044048 | A1* | 11/2001 | Ogasawara et al. | 429/223 |
| 2001/0046600 | A1* | 11/2001 | Hsiao et al. | 428/365 |
| 2006/0159998 | A1* | 7/2006 | Harada et al. | 429/236 |

FOREIGN PATENT DOCUMENTS

| JP | 55-30180 | | 3/1980 |
|---|---|---|---|
| JP | 03017957 | | 1/1991 |
| JP | 4-248268 | | 9/1992 |
| JP | 5-290838 | | 11/1993 |
| JP | 8250125 | | 9/1996 |
| JP | 08250125 | * | 9/1996 |
| JP | 8315811 | | 11/1996 |
| JP | 8-321303 | | 12/1996 |
| JP | 2001-313038 | | 11/2001 |
| JP | 2003-109600 | | 4/2003 |
| JP | 2005-347177 | | 12/2005 |
| JP | 2006-73463 | | 3/2006 |

OTHER PUBLICATIONS

Patent Abstracts of Japan for Japanese Publication No. 2001-313038, Publication date Nov. 9, 2001 (1 page).
Patent Abstracts of Japan for Japanese Publication No. 2003-109600, Publication date Apr. 11, 2003 (1 page).
Patent Abstracts of Japan for Japanese Publication No. 2005-347177, Publication date Dec. 15, 2005 (1 page).
Patent Abstracts of Japan for Japanese Publication No. 2006-073463, Publication date Mar. 16, 2006 (1 page).
Patent Abstracts of Japan for Japanese Publication No. 04-248268, Publication date Sep. 3, 1992 (1 page).
Patent Abstracts of Japan for Japanese Publication No. 55-030180, Publication date Mar. 3, 1980 (1 page).
Patent Abstracts of Japan for Japanese Publication No. 08-321303, Publication date Dec. 3, 1996 (1 page).
Patent Abstracts of Japan for Japanese Publication No. 05-290838, Publication date Nov. 5, 1993 (1 page).
Office Action dated Sep. 30, 2008 issued by the Japanese Patent Office in corresponding Application No. 243372/2006, 7 pages.
Patent Abstracts of Japan, Publication No. 03-017957 dated Jan. 25, 1991, 1 page.
Patent Abstracts of Japan, Publication No. 08-315811 dated Nov. 29, 1996, 1 page.
Patent Abstracts of Japan, Publication No., 08-250125 dated Sep. 27, 1996, 1 page.

* cited by examiner

*Primary Examiner*—Patrick Ryan
*Assistant Examiner*—Brent Thomas
(74) *Attorney, Agent, or Firm*—Osha Liang LLP

(57) ABSTRACT

A battery electrode substrate having excellent mechanical strength and flexibility and being capable of increasing the filling density of a positive electrode active substance and, thereby, achieving a higher capacity battery, a battery electrode formed from the battery electrode substrate, and an alkaline secondary battery including the battery electrode are provided. The battery electrode substrate includes a woven or unwoven fabric and nickel for coating fibers constituting the woven or unwoven fabric, wherein the weight per area of the above-described woven or unwoven fabric is 15 g/m$^2$ or more, and 60 g/m$^2$ or less and the thickness of the above-described woven or unwoven fabric is 1.3 mm or more, and 3.0 mm or less. The battery electrode is formed from the battery electrode substrate, and the alkaline secondary battery includes the battery electrode.

9 Claims, No Drawings

BATTERY ELECTRODE SUBSTRATE, BATTERY ELECTRODE, AND ALKALINE SECONDARY BATTERY INCLUDING THE SAME

BACKGROUND OF THE INVENTION

1. Field of the Invention

The present invention relates to a battery electrode substrate to be used for a positive electrode of an alkaline secondary battery or the like, a battery electrode formed from the battery electrode substrate, and an alkaline secondary battery including the battery electrode.

2. Description of the Related Art

In recent years, the use of the alkaline secondary battery for apparatuses, e.g., hybrid cars, power tools, and the like, which are required to have high powers, has been increased, and requirements for further increase in the capacity has become intensified. A nickel hydroxide electrode has been widely used as the positive electrode of the alkaline secondary battery, and has a structure in which a battery electrode substrate is allowed to support a positive electrode active substance for inducing a cell reaction.

For the battery electrode substrate, a sintered nickel plate formed by sintering a nickel powder, a punched nickel plate, and the like have been widely used. However, in this battery electrode substrate, it is difficult to increase the filling density of the active substance and, as a result, there is a problem in that the capacity of the battery cannot be increased.

Therefore, a battery electrode substrate composed of a three-dimensional network structure having a large porosity is expected as a battery electrode substrate capable of increasing the filling density of the active substance. For example, a three-dimensionally foamed nickel produced by subjecting a porous network structure, e.g., a foamed urethane resin or an unwoven fabric, to nickel plating and, thereafter, firing and removing the urethane or the unwoven fabric fibers is used.

However, the three-dimensionally foamed nickel has small mechanical strength and poor flexibility. As a result, when an active substance is filled by injecting an active substance synthesized paste from the surface of the battery electrode substrate, if the pressure of injection is increased for the purpose of increasing the filling density, breakage and the like of the network structure occurs. On the other hand, if the pressure is low, there is a problem in that a high filling density is not obtained. In order to solve the problems, battery electrode substrates provided with an unwoven fabric and a nickel plating film disposed on the fibers constituting the unwoven fabric have been proposed in Japanese Unexamined Patent Application Publication No. 2001-313038, Japanese Unexamined Patent Application Publication No. 2003-109600, Japanese Unexamined Patent Application Publication No. 2005-347177, and the like.

However, it is difficult for even battery electrode substrates disclosed in the above-described patent documents to further increase the filling density of the active substance satisfactorily. Consequently, there is a problem in that it is difficult to further increase the capacity of the battery.

SUMMARY OF THE INVENTION

The present invention has been made in order to solve the above-described known problems. Accordingly, it is an object of the present invention to provide a battery electrode substrate having excellent mechanical strength and flexibility and being capable of increasing the filling density of an active substance and, thereby, achieving a higher capacity battery.

Furthermore, the present invention provides a battery electrode formed from the battery electrode substrate and an alkaline secondary battery including the battery electrode.

The inventors of the present invention conducted intensive research on the above-described problems. As a result, it was found that when a battery electrode substrate was composed of a fabric, e.g., an unwoven fabric, and a nickel plating film disposed on fibers constituting the fabric, the weight per area of the above-described fabric was set within a specific range, and the thickness of the battery electrode substrate was set within a specific range, with respect to the resulting battery electrode substrate, the porosity became comparable to the porosity of the three-dimensionally foamed nickel, an adequate amount of active substance was able to be filled in, the capacity of the battery was able to be increased and, in addition, excellent mechanical strength and flexibility were exhibited. Consequently, the present invention has been completed.

A first aspect of the present invention provides a battery electrode substrate including a woven or unwoven fabric and nickel for coating fibers constituting the woven or unwoven fabric, wherein the weight per area of the above-described woven or unwoven fabric is 15 $g/m^2$ or more, and 60 $g/m^2$ or less and the thickness of the above-described woven or unwoven fabric is 1.3 mm or more, and 3.0 mm or less.

The woven or unwoven fabric to be used in the present invention is characterized in that the weight per area is 15 $g/m^2$ or more, and 60 $g/m^2$ or less and the thickness is 1.3 mm or more, and 3.0 mm or less. Since the weight per area is 60 $g/m^2$ or less in the range of the thickness of 1.3 to 3.0 mm, the porosity of the woven or unwoven fabric is high, and when this is used, a battery electrode substrate having a porosity comparable to foamed nickel can be produced. Furthermore, since the porosity is high and, in addition, the thickness is 1.3 mm or more, it becomes possible to fill the active substance in an amount adequate for achieving a high capacity. That is, a higher capacity battery can be obtained by using the resulting battery electrode substrate.

On the other hand, since the weight per area is 15 $g/m^2$ or more in the range of the thickness of 1.3 to 3.0 mm, the woven or unwoven fabric has an adequate strength, and a battery electrode substrate having excellent mechanical strength and flexibility is produced.

The fiber constituting the woven or unwoven fabric is not specifically limited insofar as the fiber has the alkali resistance. Preferable examples thereof include polyolefin based fibers and polyamide resin based fibers. There have already been track records of using these fibers as separators of batteries. Since the fibers do not dissolve into a 20 to 35-percent by weight KOH aqueous solution even when the fibers come into contact with it, the properties do not change. Therefore, theses fibers have excellent alkali resistance, and are inexpensive, so that high general versatility is exhibited.

Examples of resins constituting polyolefin based fibers include polyethylene, polypropylene, polymethylpentene, ethylene-propylene copolymers, ethylene-butene-propylene copolymers, and ethylene-vinyl alcohol copolymers. Examples of polyolefin based fibers may include fibers formed from one type of these resins and composite fibers formed from at least two types of these resins. Examples of resins constituting polyamide resin based fibers include Nylon 6, Nylon 66, Nylon 12, and copolymers of Nylon 6 and Nylon 12. Examples of polyamide resin based fibers can include fibers formed from one type of these resins and composite fibers formed from at least two types of these resins.

In the case where the woven or unwoven fabric is formed from polyolefin based fibers, among the above-described examples, the fiber composed of polyethylene or polypropylene having excellent alkali resistance or acid resistance or the composite fiber composed of polyethylene and polypropylene in combination is preferable (a second aspect).

A core/sheath composite fiber in which a polypropylene core is coated with a polyethylene sheath is favorable because both the alkali resistance and the strength characteristic can be satisfied. In this case, as the ratio of polypropylene/polyethylene becomes higher, the elasticity of the fiber is improved. In particular, it is preferable that the weight ratio of the polypropylene to the polyethylene is 0.25 or more, because the weight per area can be decreased while the thickness is maintained. A third aspect corresponds to this preferred form.

It is preferable that the ratio of polypropylene/polyethylene (weight ratio) is 95/5.

In the case where the unwoven fabric is used, fibers having a fineness of up to about 1.0 to 30 dTex can be used. A larger fineness is preferable because the elasticity of the fiber is increased. In particular, 1.5 dTex or more is preferable (a fourth aspect). When the fineness is specified to be 1.5 dTex or more, the weight per area can be decreased while the thickness of the battery electrode substrate is maintained. However, if the fineness is too large, the formation of the unwoven fabric becomes difficult. Therefore, the fineness is usually 10 dTex or less.

The unwoven fabric can be produced by, for example, forming a web of fibers constituting the unwoven fabric and, thereafter, bonding the fibers to each other. The web of fibers can be produced by, for example, a dry method, e.g., a card method, an air lay method, or a melt blow method or spunbond method, in which sheeting is performed continuously from a spinning state; or a wet method, in which fibers are dispersed into water, and are taken as a sheet. Most of all, production by the dry method is preferable because the weight per area of the fibers can be further decreased (a fifth aspect).

Examples of methods for bonding fibers to each other include a hydroentangling treatment in which very fine high-pressure water jet is applied impulsively, an entangling treatment with a needle punch, and a heat treatment in which fibers are heated to a temperature higher than the softening point thereof, and lower than the thermal decomposition temperature so as to locally fusion-bond the fibers to each other at contact points. The above-described entangling treatment and the heat treatment may be performed alone. However, it is favorable that the heat treatment is performed after the entangling treatment is performed because the strength characteristic of the resulting unwoven fabric is improved. Furthermore, the porosity can also be adjusted at an appropriate value by the above-described entangling treatment and the heat treatment. In the case where the above-described core/sheath composite fibers, in which polypropylene is coated with polyethylene, are used as the fibers, the heat treatment temperature is preferably 110° C. to 140° C.

In order to improve the adhesion between the woven or unwoven fabric and the layer of nickel coating, a hydrophilization treatment of the fiber surface may be performed. Examples of hydrophilization treatments include a fluorine treatment, a corona discharge treatment, a sulfonation treatment, graft polymerization of vinyl monomer, a treatment with a hydrophilic resin, and a treatment with a surfactant.

The battery electrode substrate according to an aspect of the present invention can be produced by coating the surfaces of fibers constituting the above-described woven or unwoven fabric with nickel. Examples of coating methods include a method in which a nickel layer is formed on the surfaces of fibers of the woven or unwoven fabric by electroless plating or sputtering so as to allow the surfaces to become electrically conductive and, thereafter, electrolytic plating is performed.

The sputtering or the electroless plating can be performed under the same condition as that of general sputtering or electroless plating. For example, the electroless plating can be performed by a method in which the woven or unwoven fabric is immersed in a catalyst-imparting bath so as to be provided with a catalyst and, thereafter, the woven or unwoven fabric is immersed in a plating bath so as to be plated (electroless plating step). The imparting of the catalyst can be performed by, for example, a method in which the woven or unwoven fabric is treated with a hydrochloric acid aqueous solution of stannous chloride and, thereafter, the catalyst is derived by using a hydrochloric acid aqueous solution of palladium chloride. The electroless plating step can be performed by, for example, a method in which the woven or unwoven fabric is immersed in an aqueous solution containing a nickel salt, e.g., nickel nitrate, nickel chloride, or nickel sulfonate, and nickel is reduced by a reducing agent, e.g., a hydrazine derivative.

The electrolytic plating is performed by using a plating bath, e.g., a Watts bath, a chloride bath, and a sulfamic acid bath. A nickel coating can be further formed on the nickel layer formed by electroless plating or the sputtering by immersing the above-described woven or unwoven fabric, in which the surfaces of fibers have been allowed to become electrically conductive by the electroless plating or the sputtering, in a plating bath, connecting the woven or unwoven fabric to a cathode and connecting the nickel counter electrode to an anode, and passing a direct current or pulsed interrupted current.

Preferably, the weight per area of nickel is within the range of 20 g/m$^2$ or more, and 350 g/m$^2$ or less (a sixth aspect). Here, the weight per area of nickel is determined by dividing the weight (g) of nickel applied through electroless plating, sputtering, electrolytic plating, or the like by the area of the battery electrode substrate, and refers to the amount of nickel coating per unit area of the battery electrode substrate. If the weight per area of nickel is less than 20 g/m$^2$, the electrical conductivity of the battery electrode substrate is decreased, and the current collection characteristic of the electrode produced by using this tends to deteriorate. When the current collection characteristic deteriorates, the factor of utilization tends to decrease. In particular, this problem becomes remarkable in the case where the current rate during discharge of the battery is high (high rate discharge). When the weight per area of nickel is 20 g/m$^2$ or more, since the amount of nickel is increased relative to the amount of fibers, the resulting battery electrode substrate has excellent weldability. This point is also favorable.

The electrical conductivity of the battery electrode substrate tends to be improved as the weight per area of nickel is increased. However, if the weight per area of nickel exceeds 350 g/m$^2$, the porosity of the battery electrode substrate is decreased, the filling amount of the active substance is hard to become adequate and, therefore, the capacity of the battery tends to become hard to increase. In the case where the weight per area of the unwoven fabric is 15 g/m$^2$ or more, and 60 g/m$^2$ or less, even when the weight per area of nickel is increased to more than 350 g/m$^2$, the electrical conductivity is not improved. Therefore, 350 g/m$^2$ or less is preferable from the view point of a cost merit.

After the coating of nickel is applied as described above, preferably, thickness of the woven or unwoven fabric is adjusted. The thickness adjustment is performed by compressing the woven or unwoven fabric with roller press or the like. By the thickness adjustment, the surface is smoothed and, in addition, the thickness and the porosity are adjusted. Since the thickness and the porosity can be adjusted as described above, variations in the amount of filling of active substance can be reduced and it becomes possible to meet various capacities of electrodes. Therefore, the guideline of the degree of thickness adjustment varies depending on the thickness and the porosity of the woven or unwoven fabric and desired thickness and the porosity of the electrode substrate. Furthermore, the guideline varies depending on, for example, the amount of water of the active substance paste to be used for filling the active substance and, therefore, is not specifically limited.

Preferably, the porosity after the thickness adjustment is within the range of 95% or more, and 98% or less. When the porosity is in this range, excellent mechanical strength is exhibited. In addition, the filling of the active substance becomes easy, and a high filling density can be obtained. It is preferable that the thickness adjustment is performed under the condition suitable for adjusting the porosity after the thickness adjustment within this range.

Besides the above-described battery electrode substrate, an aspect of the present invention provides a battery electrode in which an active substance is filled in the battery electrode substrate (a seventh aspect).

For the active substance, those primarily containing nickel hydroxide can be used. Besides nickel hydroxide as the primary component, this active substance may contain other components, e.g., cobalt hydroxide, cobalt oxyhydroxide, cobalt monoxide, and zinc hydroxide. The active substance can be filled by a method in which the battery electrode substrate subjected to the above-described thickness adjustment is immersed in a paste including components primarily containing nickel hydroxide, followed by pressuring so as to inject the paste from the surface of the battery electrode substrate or a method in which the paste is sprayed on the surface of the battery electrode substrate. After the gaps in the battery electrode substrate are filled with the paste containing the active substance, usually, drying and rolling are performed, so that a battery electrode (positive electrode) can be produced. If necessary, an external terminal for current collection is further disposed on the battery electrode (positive electrode).

In the production of a battery electrode, the battery electrode substrate is shaped into the battery electrode by cutting or the like. This step may be performed before the injection of the paste, after the drying and rolling, or at both times.

The rolling is performed by using a roller press or the like. The battery electrode is further compressed by the rolling to a predetermined thickness, so that a battery electrode having a smoothed electrode plane can be produced.

An aspect of the present invention provides an alkaline secondary battery characterized by including the battery electrode (an eighth aspect).

The alkaline secondary battery according to an aspect of the present invention can be formed by encapsulating hermetically an electric power generation unit composed of the positive electrode formed from the above-described battery electrode, a negative electrode, and a separator and an electrolyte into a battery case.

The negative electrode, the electrolyte, and the battery case can be the same as those used in a known alkaline secondary battery. Examples of negative electrodes can include an electrode by using a hydrogen storage alloy containing hydrogen, and examples of electrolytes can include a potassium hydroxide aqueous solution. The separator is to prevent short circuit between the negative electrode and the positive electrode and hold the electrolyte. The separator can also be the same as that used in a known alkaline secondary battery. For example, an unwoven fabric formed from hydrophilized polyolefin fibers can be used.

The structure of the alkaline secondary battery according to an aspect of the present invention can be the same as that of a known alkaline secondary battery as well. Examples thereof include a structure in which the above-described positive electrode, the negative electrode, and the separator are made into belt shapes, these are stacked and rolled into the shape of a roll so as to form a roll-shaped electric power generation unit, and the resulting roll-shaped electric power generation unit is stored in a cylindrical battery case. Examples of structures can also include a structure, in which a prismatic battery case is used, the belt prepared by stacking the positive electrode, the negative electrode, and the separator is rolled in such a way as to meet the cross-sectional shape of the battery case to produce an electric power generation unit, and a structure in which a prismatic battery case is used, the belt prepared by stacking the positive electrode, the negative electrode, and the separator is stacked in the shape of a bellows so as to produce an electric power generation unit. Since the battery electrode substrate according to an aspect of the present invention has excellent mechanical strength and flexibility, a problem, that is, deterioration of the battery characteristic due to breakage during rolling and stacking in the shape of a bellows, is hard to occur.

The battery electrode substrate according to an aspect of the present invention has excellent mechanical strength and flexibility and is capable of increasing the filling density of an active substance and, thereby, achieving a higher capacity battery. Therefore, a battery electrode formed from the battery electrode substrate according to an aspect of the present invention is capable of achieving a higher capacity battery. An alkaline secondary battery including the battery electrode according to an aspect of the present invention is suitable for the use in apparatuses, e.g., hybrid cars, power tools, and the like, which are required to have high powers.

DESCRIPTION OF THE PREFERRED EMBODIMENTS

The best mode for carrying out the present invention will be described below with reference to examples. However, the present invention is not limited to merely the examples.

EXAMPLES

Examples 1 to 3 and Comparative Example 1 to 3

Preparation of Unwoven Fabric

An unwoven fabric having a weight per area shown in Table I was formed by using a core/sheath composite fiber (fineness 6.6 dTex), in which a core component was polypropylene (PP), a sheath component was polyethylene (PE), and a PP/PE ratio was 3/7, and performing a spun lace method. When the weight per area of fibers was decreased to 10 g/m$^2$, an unwoven fabric was not able to be formed stably.

Preparation of Battery Electrode Substrate

Each of the resulting unwoven fabrics was imparted with electrical conductivity by application of 8 g/m$^2$ of nickel by a sputtering method on the fibers constituting the unwoven fabric. Thereafter, the fibers were coated with nickel by electrolytic nickel plating in such a way that the total weight per area of nickel became 200 g/m$^2$ so as to produce a battery electrode substrate (before thickness adjustment). The electrolytic nickel plating was performed by a method in which the above-described unwoven fabric imparted with the electrical conductivity was wound around a carrier and fed into a Watts bath containing 330 g/L of nickel sulfate, 50 g/L of nickel chloride, and 40 g/L of boric acid as primary components.

The resulting battery electrode substrate was subjected to thickness adjustment with a roller press in such a way that the thickness thereof became 1.5 mm. The thickness and the porosity of each of the nickel-plated unwoven fabric before the thickness adjustment and those after the thickness adjustment are shown in Table I. The porosity was determined by the following equation on the basis of the measurement of the apparent volume and the amount of fibers of the unwoven fabric and the total amount of nickel applied.

porosity (%)=[{apparent volume−(amount of fibers/fiber density)−(amount of nickel/nickel density)}/apparent volume]×100

Preparation of Battery Electrode

A paste-like positive electrode active substance mix for a nickel hydrogen battery, the mix containing 92 percent by weight of nickel hydroxide and 2 percent by weight of cobalt hydroxide as primary components, was filled into each of the battery electrode substrates after the thickness adjustment. The filling was performed by a method, in which an active substance mix paste was injected into a base material, aimed at the thickness of 0.7 mm after compression by using a roller press and the capacity density of the electrode of 750 mAh/cc. However, in Comparative examples, the capacity density of 750 mAh/cc was not able to be reached and only a low capacity density was obtained in practice. In Comparative examples 1 and 2, compression up to the thickness of 0.7 mm was not able to be achieved. After the filling, an excess paste adhered to the base material surface was shed so as to smooth the electrode surface, followed by drying. Thereafter, a nickel hydrogen battery positive electrode was formed through compression by using a roller press. The detail of the resulting electrode is shown in Table I.

Preparation of Alkaline Secondary Battery, Capacity Density.

The nickel hydrogen battery positive electrode prepared as described above, a first separator, a known hydrogen storage alloy negative electrode, and a second separator were made into the same belt shape, these were laminated in the above-described order and rolled into the shape of a roll so as to form a roll-shaped electric power generation unit. The resulting roll-shaped electric power generation unit and a negative electrode active substance (electrolytic solution), in which 30 g/l of lithium hydroxide was dissolved into a 30 percent by weight potassium hydroxide aqueous solution, were encapsulated hermetically into a cylindrical battery case so as to produce an alkaline secondary battery. The capacity density of the resulting alkaline secondary battery is shown in Table I. The capacity density is a value calculated on the basis of the battery capacity and the volume of the battery, where the battery capacity is derived from the amount of filling of nickel hydroxide (289 mAh/g) determined from a weight difference between before and after the filling of a positive electrode active substance mix.

TABLE I

|  | Example 1 | Example 2 | Example 3 | Comparative example 1 | Comparative example 2 | Comparative example 3 |
|---|---|---|---|---|---|---|
| Weight per area of fibers (g/m$^2$) | 15 | 30 | 50 | 75 | 100 | 30 |
| Thickness (mm) | 1.8 | 1.8 | 1.8 | 1.8 | 1.8 | 1.0 |
| Porosity (%) | 97.8 | 96.9 | 96.1 | 94.9 | 93.7 | 94.5 |
| Thickness after thickness adjustment (mm) | 1.5 | 1.5 | 1.5 | 1.5 | 1.5 | 1.0 |
| Porosity after thickness adjustment (%) | 96.8 | 96.3 | 95.4 | 93.9 | 92.4 | 94.5 |
| Electrode thickness (mm) | 0.67 | 0.69 | 0.7 | 0.82 | 0.88 | 0.60 |
| Capacity density (mAh/cc) | 760 | 750 | 750 | 690 | 640 | 580 |

As is clear from Table I, in Examples 1 to 3, electrodes having a desired thickness (0.7 mm) and a capacity density (750 mAh/cc) were able to be produced. However, in Comparative examples 1 and 2, the desired capacity density (750 mAh/cc) was not able to be obtained, and only batteries having low capacity densities were obtained. Furthermore, compression up to the thickness of 0.7 mm was not able to be achieved by using the roller press, and only electrodes having thicknesses exceeding 0.8 mm were obtained.

The reason for this is believed that since the weight per area of fibers of the unwoven fabric was large, the porosity was small, gaps required for filling an adequate active substance or gaps capable of being compressed by pressurization were not ensured. Furthermore, it is also believed to be a reason that since the thickness of the resulting electrode (positive electrode) was large, the number of rolling of the laminate of the positive electrode, the separator, and the negative electrode was decreased and, thereby, the capacity of the battery was decreased.

Likewise, in Comparative example 3, the desired capacity density (750 mAh/cc) was not able to be obtained, and only a battery having a low capacity density was obtained. In Comparative example 3, it is believed that since the weight per area of fibers of the unwoven fabric was small and the thickness was also small, the porosity of the unwoven fabric was small as compared with the porosities in Examples and, thereby, the capacity density became small. Furthermore, it is also believed to be a reason that since the thickness of the electrode (positive electrode) was a small 0.6 mm, the number of rolling was increased correspondingly, whereas the proportion of the thickness of the positive electrode relative to the total of the positive electrode, the separator, and the negative electrode was decreased and, as a result, the proportion of the positive electrode in the battery was decreased and the capacity of the battery was decreased.

Measurement of Discharge Capacity of Electrode

With respect to alkaline secondary batteries prepared in the above-described Examples 1 to 3, initial charge and discharge were performed a few times as a chemical conversion treatment. Thereafter, charge/discharge was performed at a current rate shown in Table II, so as to examine the factor of utilization. The C/D rate shown in Table II represents current rates of charge (C) and discharge (D), respectively, and specifically represents ratios of the current of charge (C) and the current of discharge (D) to the current when an amount of electricity charged or discharged over 1 hour corresponds to the capacity of the battery. The factor of utilization refers to a ratio of the amount of actually discharged electricity to the calculated capacity (capacity density x internal volume of battery), expressed in percent. The charge was performed up to 120% of the battery capacity, and the discharge termination voltage was set at 0.8 V. The measurement results of the factor of utilization are shown in Table II.

TABLE II

| C/D rate | Example 1 | Example 2 | Example 3 |
|---|---|---|---|
| 0.2/0.2 | 101 | 100 | 100 |
| 0.2/0.5 | 98 | 98 | 98 |
| 0.5/0.2 | 100 | 99 | 100 |
| 0.5/0.5 | 97 | 97 | 96 |
| 0.5/1.0 | 93 | 93 | 93 |

As is clear from Table II, every electrode exhibited a high factor of utilization. In particular, even when the discharge (D) rate was 1.0, a factor of utilization exceeding 90% was exhibited. It is shown that the electrode is excellent so as to exhibit a high factor of utilization even in so-called high-rate charge and discharge.

What is claimed is:

1. A battery electrode substrate comprising:
a woven or unwoven fabric; and
nickel for coating fibers constituting the woven or unwoven fabric,
wherein the weight per area of the woven or unwoven fabric is 15 g/m$^2$ or more, and 60 g/m$^2$ or less and the thickness of the woven or unwoven fabric is 1.8 mm or more, and 3.0 mm or less; and
wherein the porosity of the substrate is at least 95%.

2. The battery electrode substrate according to claim 1, wherein the fibers constituting the woven or unwoven fabric are formed from a resin selected from polyethylene and polypropylene or a composite resin composed of polyethylene and polypropylene.

3. The battery electrode substrate according to claim 2, wherein the fibers constituting the woven or unwoven fabric are core/sheath composite fibers in which polypropylene is coated with polyethylene, and the weight ratio of the polypropylene to the polyethylene is 0.25 or more.

4. The battery electrode substrate according to claim 1, wherein the woven or unwoven fabric is an unwoven fabric composed of fibers having a fineness of 1.5 dTex or more.

5. The battery electrode substrate according to claim 1, wherein the woven or unwoven fabric is an unwoven fabric formed by a dry method.

6. The battery electrode substrate according to claim 1, wherein the weight per area of nickel is 20 g/m$^2$ or more, and 350 g/m$^2$ or less.

7. A battery electrode in which an active substance is filled in the battery electrode substrate according to claim 1.

8. An alkaline secondary battery comprising the battery electrode according to claim 7.

9. The battery electrode substrate according to claim 1, wherein the porosity of the substrate is at least 96.1%.

* * * * *